3 Sheets—Sheet 1.
C. J. B. GAUME.
ELECTROMAGNETIC ENGINE.
No. 63,380.          Patented Apr. 2, 1867.
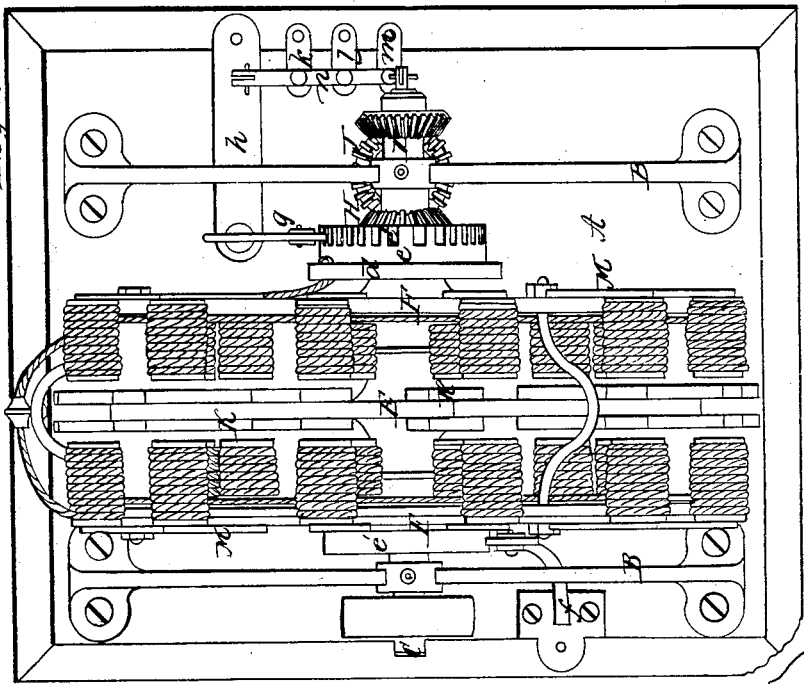
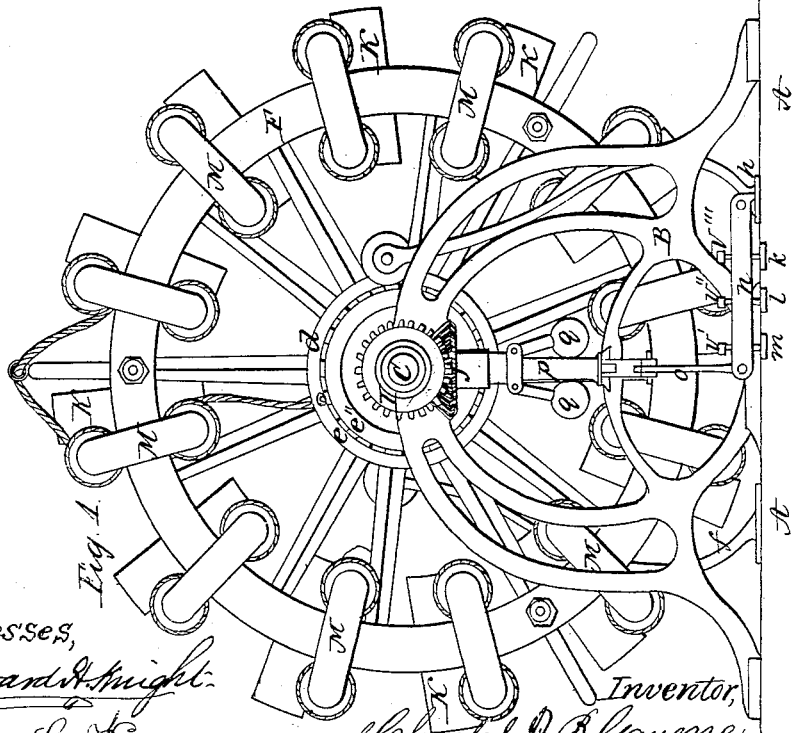
Witnesses,
Edward H. Knight
Solon C. Kemon
Inventor,
Charles J. B. Gaume
by Munn & Co, his Attorneys.

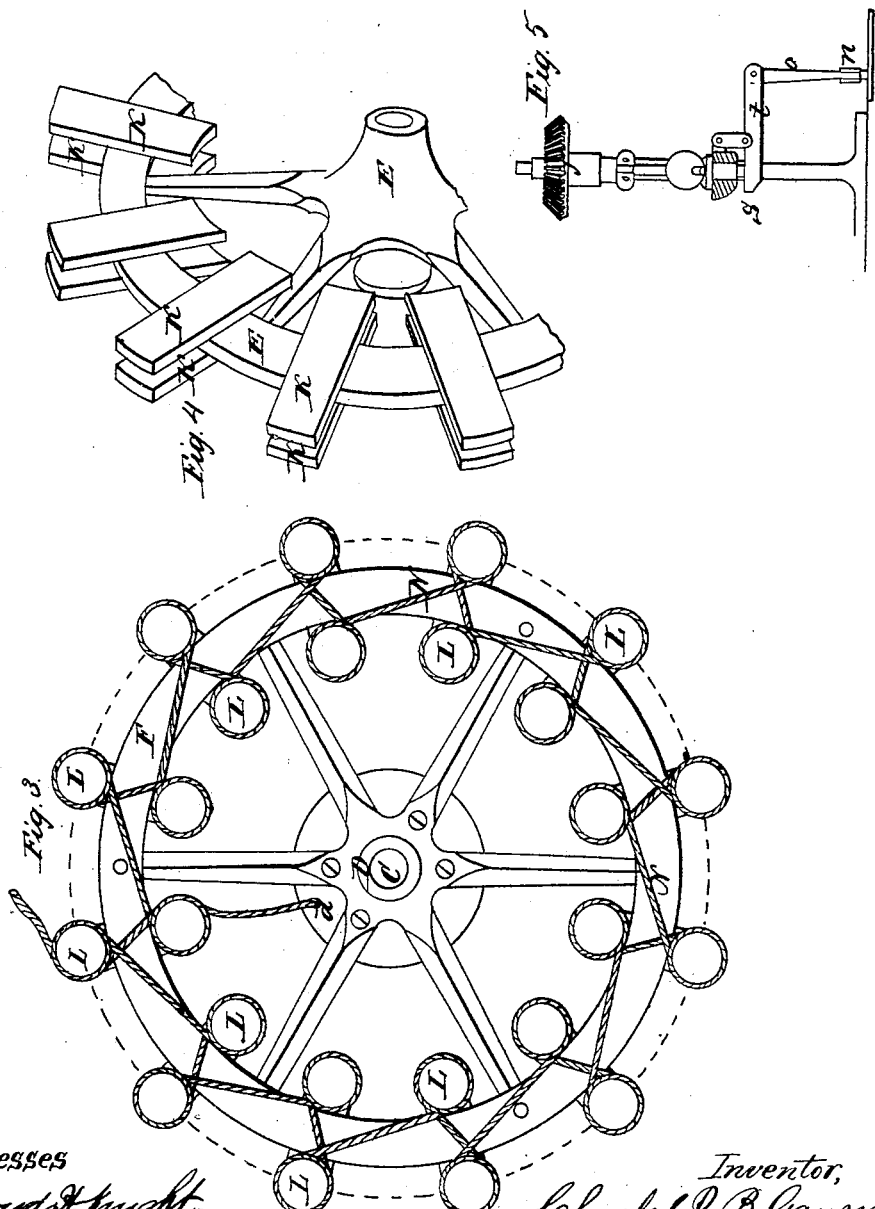

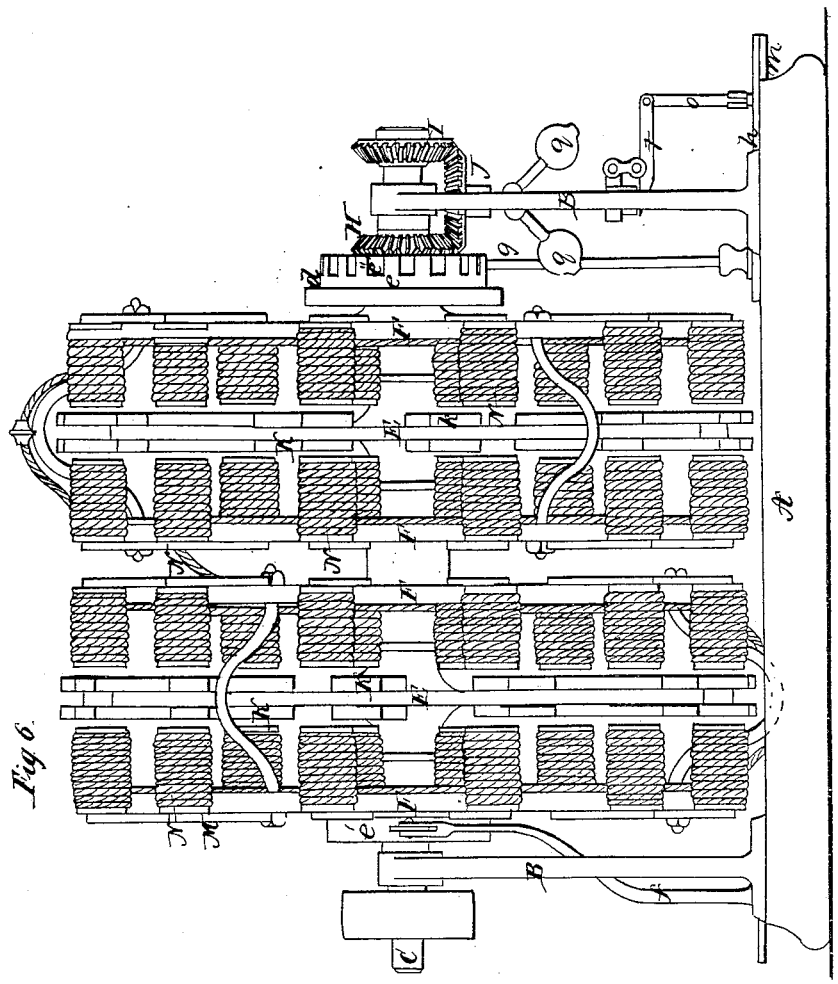

United States Patent Office.

CHARLES J. B. GAUME, OF DAVENPORT, IOWA.

Letters Patent No. 63,380, dated April 2, 1867.

---

IMPROVEMENT IN ELECTRO-MAGNETIC ENGINES.

---

The Schedule referred to in these Letters Patent and making part of the same.

---

TO ALL WHOM IT MAY CONCERN:

Be it known that I, CHARLES J. B. GAUME, of Davenport, in the county of Scott, and State of Iowa, have made a new and useful improved Electro-Magnetic Engine; and I do hereby declare the following to be a full, clear, and exact description of the nature, construction, and operation of the same, sufficient to enable one skilled in the art to which it appertains to construct and use the same, reference being had to the accompanying drawing, which is made part of this specification. and in which—

Figure 1 is a side elevation.

Figure 2 is a plan or top view.

Figure 3 is a side elevation illustrating the mode of forming the continuous series of coils.

Figure 4 is a perspective view of a portion of the inner wheel containing the series of iron plates to be successively attached by each of the series of electro-magnets.

Figure 5 is a detached view of the governor.

The improvement consists of an electro-magnetic engine in which a series of electro-magnets are placed on or near the periphery of a wheel so as to attract successively the iron plates on a wheel journalled upon the same axis, the series of magnets being formed by wrapping a continuous wire upon the series of cores, and the motion of the wheel carrying the magnets being the means of alternately making and breaking the circuit by which the said cores are made magnetic. The battery wire is so connected to the engine as to have a reserve which is capable of being attached or detached by the motion of a governor, so that the speed of the engine shall be the means of determining the extent of battery connection.

In the drawings, A is the wooden platform of the engine from which rise the standards B, which support the axis C of the wheel E, and also the wheels F, whose hubs D are sleeved upon the said axis, and run in a different direction thereto, as the wheels F are connected to the bevel-wheel H, and the wheel E to the bevel-wheel I, which are in connection with the opposite sides of the bevel-wheel J, upon whose shaft the governor is arranged. Attached to the wheel E is a series of pairs of soft iron plates, K K, and this wheel revolves between the wheels F F, to each of which is attached a series of cores, L L, united by plates M. Around the cores, seriatim, is wound a wire, N, in the manner shown in the fig. 3. The wire, after being wrapped around the cores successively of one, crosses over to the other wheel F, where it is similarly wrapped around all the cores of the latter. The ends of the wire are connected through the wooden flanges $d$ of the hubs to the metal bands $c\,c'$. In the latter case, the connection is made with the zinc of the battery by the arm $f$, which has a roller running against the strip $c'$, and a means of attachment for the ground wire. In the former case the strip $e$ is provided with alternate conductors and non-conductors $e''$, so that the roller and arm $g$, connecting with the plate $h$ to which is attached the battery wire, will alternately make and break the electric circuit. The plate $h$ being in constant battery connection, whenever the roller on the arm $g$ is in contact with the metal strip $e$, the electric circuit is complete, and the series of electric magnets on the peripheries of the wheels F attract the iron plates K on the wheel E, and when the roller on the arm $g$ is in contact with a non-conductor $e''$ the circuit is broken and the iron plates on the wheel E are no longer affected. A determinate impulse in a given direction having been given to the wheels their impetus carries them in the intervals of time, when the electric circuit is broken and the electric impulse being imparted at a certain period, the plates are individually attracted towards the electro-magnet next in series, and an additional impulse is communicated, producing an increment of speed. The governor-balls $q\,q$ are pivoted in the usual manner to a collar on the vertical shaft $p$, which is revolved by the bevel-wheel J. When the balls rise under increase of speed, toes on the inner end of the governor-arms press upon a central rod, $s$, (fig. 5,) and depress one end of the lever $t$, raising the connecting-rod $o$ and the lever $n$, in which are three keys, $V'\,V''\,V'''$, which, when the lever $t$ is in a horizontal position, are in contact with the plates $k\,l\,m$, to which are attached wire from auxiliary batteries. When the governor reaches a certain high speed, the balls will, by the devices described, lift the lever $n$, and raise the key $V'$ from contact with the plate $m$, and thus disconnect the engine from the battery in communication therewith. If the speed still increases the key $V''$ will be thrown out of connection with the battery attached to plate $l$, and ultimately the battery belonging to plate $k$ will be disconnected from the engine if the speed increases to the requisite degree. Thus, it will be seen that the amount of battery is graduated to the speed, successive battery connections being severed as the speed increases, and, conversely, being reconnected when the speed decreases. The wheels E carrying the soft metal plates may be arranged on each side of the magnet-wheel F, being an interchange of their respective positions, as shown in the drawings.

Having described my invention, what I claim as new, and desire to secure by Letters Patent, is—

The arrangement of the wheels F F, provided with the electro-magnetic coils as described, with the wheel E, provided with the duplicate set of iron plates $k$, arranged radially as set forth, operating through the medium of the alternate battery connection and disconnection, substantially as described.

The above specification of my electro-magnetic engine signed this 23d of April, 1866.

CH. J. B. GAUME.

Witnesses:
 ALEXR. A. C. KLAUCKE,
 SOLON C. KEMON.